(12) United States Patent
Lin et al.

(10) Patent No.: US 9,141,741 B1
(45) Date of Patent: Sep. 22, 2015

(54) METHODS, SYSTEMS, AND ARTICLES OF MANUFACTURE FOR IMPLEMENTING MIXED-SIGNAL ELECTRONIC CIRCUIT DESIGNS WITH POWER DATA IN STANDARDIZED POWER FORMATS

(71) Applicant: Cadence Design Systems, Inc., San Jose, CA (US)

(72) Inventors: Qingyu Lin, San Jose, CA (US); Nan Zhang, Beijing (CN); Zhong Fan, Union City, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/066,567

(22) Filed: Oct. 29, 2013

(51) Int. Cl.
*G06F 17/50* (2006.01)

(52) U.S. Cl.
CPC .......... *G06F 17/505* (2013.01); *G06F 17/5045* (2013.01)

(58) Field of Classification Search
CPC . G06F 17/50; G06F 13/4295; G06F 17/5045; G06F 17/505
USPC ................. 716/100, 106–107, 109, 110–112, 716/132–133
See application file for complete search history.

(56) References Cited

U.S. PATENT DOCUMENTS

| | | | |
|---|---|---|---|
| 6,829,753 B2* | 12/2004 | Lee et al. ........................ | 716/30 |
| 6,832,358 B2* | 12/2004 | Foster et al. .................... | 705/59 |
| 7,076,415 B1* | 7/2006 | Demler et al. ................... | 703/14 |
| 7,251,795 B2* | 7/2007 | Biswas et al. .................. | 716/103 |
| 7,779,381 B2* | 8/2010 | Chickermane et al. ........ | 716/111 |
| 8,234,617 B2* | 7/2012 | Chetput et al. ................. | 716/136 |
| 8,296,699 B1* | 10/2012 | Chetput et al. ................. | 716/106 |
| 8,554,530 B1* | 10/2013 | O'Riordan et al. ............. | 703/14 |
| 8,601,426 B1* | 12/2013 | Du ................................. | 716/133 |
| 8,661,402 B2* | 2/2014 | Bhushan et al. ............... | 716/139 |
| 8,732,630 B1* | 5/2014 | Kolpekwar et al. ........... | 716/101 |
| 8,732,636 B2* | 5/2014 | Ginetti et al. .................. | 716/106 |
| 8,788,988 B2* | 7/2014 | Reed et al. ..................... | 716/102 |
| 8,826,205 B2* | 9/2014 | Wang et al. .................... | 716/107 |

(Continued)

OTHER PUBLICATIONS

Mather, Anmol et al., "CPF 2.0 Tutorial", Mar. 2011, Silicon Integration Initiative, Inc., pp. 1-53.*

(Continued)

*Primary Examiner* — Stacy Whitmore
(74) *Attorney, Agent, or Firm* — Vista IP Law Group, LLP

(57) ABSTRACT

Some aspects are directed at methods and systems that directly specifies or uses standardized power data in standardized format(s) in various design tasks for implementing mixed-signal electronic designs by using native process(es) or module(s) of standardized power format framework(s) to evaluate legal signals or expressions to generate the first output and evaluation process(es) or module(s) to evaluate illegal signals or expressions to generate the second output for the design tasks, without using wrappers to encapsulate circuit blocks generating illegal signals and hence disrupt the original design hierarchical structures or using translators to translate illegal signals or expressions into corresponding legal signals or expressions for the standardized power format frameworks. The methods or systems evaluate combinations of legal and illegal signals and expressions by forwarding both the first and second outputs to standardized power format frameworks to use their native process(es) or module(s) to evaluate the combinations.

29 Claims, 11 Drawing Sheets

(56) References Cited

U.S. PATENT DOCUMENTS

| | | | |
|---|---|---|---|
| 2003/0033595 A1* | 2/2003 | Takagi et al. | 717/143 |
| 2003/0188272 A1* | 10/2003 | Korger et al. | 716/4 |
| 2011/0083114 A1* | 4/2011 | Chetput et al. | 716/106 |
| 2011/0161899 A1* | 6/2011 | Ginetti et al. | 716/106 |
| 2012/0198405 A1* | 8/2012 | Bhushan et al. | 716/112 |
| 2013/0305207 A1* | 11/2013 | Hsieh et al. | 716/136 |

OTHER PUBLICATIONS

Cadence, "Building Energy-Efficiant ICs from the ground up", !Feb. 5, 2012, SOCentral, pp. 1-9.*

Cadence, "Building Energy-Efficiant ICs from the ground up Considering low-power techniques throughout the development process", 2011, Cadence. pp. 1-13.*

"IEEE Standard for Design and Verification of Low Power Integrated Circuits" IEEE Std 1801™—2009, Mar. 27, 2009.

"Si2 Common Power Format Specification™: Version 2.0" Feb. 14, 2011.

Errata as of Nov. 15, 2011 for Si2 Common Format Specification V2.0.

* cited by examiner

METHODS, SYSTEMS, AND ARTICLES OF MANUFACTURE FOR IMPLEMENTING MIXED-SIGNAL ELECTRONIC CIRCUIT DESIGNS WITH POWER DATA IN STANDARDIZED POWER FORMATS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Integrated circuits, or ICs, are created by patterning a substrate and materials deposited on the substrate. The substrate is typically a semiconductor wafer. The patterned features make up devices and interconnections. This process generally starts with a designer creating an integrated circuit by hierarchically defining functional components of the circuit using a hardware description language. From this high-level functional description, a physical circuit implementation dataset is created, which is usually in the form of a netlist. This netlist identifies logic cell instances from a cell library, and describes cell-to-cell connectivity.

Many phases of these electronic design activities may be performed with computer aided design (CAD) tools or electronic design automation (EDA) systems. For example, an integrated circuit designer may use a set of layout EDA application programs, such as a layout editor, to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters. The EDA layout editing tools are often performed interactively so that the designer can review and provide careful control over the details of the electronic design.

Standardized power formats have been used in purely digital designs, analog/mixed-signal (AMS) design, and digital/mixed-signal designs to describe power intent, power management data, power-specific data, or other data generally related to power (collectively "power data" hereinafter) at various stages of the electronic design automation (EDA) of these designs. These standardized power formats such as CPF (Common Power Format from Si2 or Silicon Integration Initiative) or UPF (Unified Power Format from IEEE or Institute of Electrical and Electronic Engineers) are directed at specifying power data for the design or specifying power intent and implementation of the design just once such that various EDA design tools may consistently use the power data to automatically insert power control features or to check that the result matches the power intent during the design process. General details about some exemplary standardized power formats may be found in "Si2 Common Power Format Specification", Ver. 2.0, Silicon Integration Initiative, Inc., Feb. 14, 2011 and IEEE Std "1801-2009—IEEE Standard for Design and Verification of Low Power Integrated Circuits", IEEE Mar. 27, 2009, the content of both documents is hereby explicitly incorporated by reference for all purposes.

One of the limitations of these standardized power formats is that only logic signals or expressions are considered legal such that all controlling or controlled signals need to be logic in order to be recognized and utilized in these standardized power formats. Nonetheless, the controlling or controlled signals in, for example, purely analog design, analog/mixed-signal designs, and digital/mixed-signal designs (collectively mixed-signal design or mixed-signal designs) are not necessarily logic and thus present a challenge in leveraging these standardized power formats during the design process because these standardized power formats do not recognize and hence cannot process non-logic signals or expressions.

Thus, there exists a need for a method, a system, and an article of manufacture for Implementing mixed-signal electronic circuit designs with power data in standardized power formats.

SUMMARY

Disclosed are method(s), system(s), and article(s) of manufacture for Implementing mixed-signal electronic circuit designs with power data in standardized power formats in one or more embodiments. In some embodiments, a computer system executing various modules described herein may execute the method for directly specifying or using standardized power data in one or more standardized formats (e.g., the Common Power Format or CPF, Unified Power Format or UPF, etc.) in various design tasks for implementing mixed-signal electronic designs by using one or more native processes or modules that are built into one or more standardized power format frameworks to evaluate legal signals and expressions to generate the first output. The method may also use one or more evaluation or elaboration processes or modules to evaluate illegal or incompatible signals or expressions, which are not recognized in standardized power format frameworks, to generate the second output for various design tasks.

The method thus incorporate standardized power data in one or more standardized power format into various design tasks, without using wrappers to encapsulate circuit blocks generating illegal or incompatible signals or expressions and hence disrupt the original design hierarchical structures by adding one or more hierarchies for the wrappers. The method thus also incorporate standardized power data in one or more standardized power format into various design tasks, without using any translators to translate illegal signals or expressions into corresponding legal or incompatible signals or expressions for various standardized power format frameworks. The methods or systems may also evaluate combinations of both legal or compatible as well as illegal or incompatible signals and expressions by forwarding both the first and second outputs to standardized power format frameworks to use their native processes or modules to evaluate the combinations, without using any wrappers or translators for circuit design blocks that generate illegal or incompatible signals or expressions.

Some first embodiments are directed at a method for implementing a mixed-signal electronic design using standardized power data. In these first embodiments, the method may include the act of identifying a mixed-signal electronic design, the act of identifying, generating, or modifying standardized power data in a standardized power format with illegal signal in the mixed-signal electronic design, and the act of implementing the mixed-signal electronic design using updated standardized power data including the illegal signal. In some of the first embodiments, the standardized power format includes at least one of Common Power Format (CPF) and Unified Power Format (UPF). In addition or in the alternative, the act of implementing the mixed-signal electronic design using updated standardized power data including the illegal signal is performed without using one or more wrappers for an electronic circuit design block that generates the illegal signal.

In some of the immediately preceding embodiments, the act of implementing the mixed-signal electronic design using updated standardized power data including the illegal signal is performed without adding one or more hierarchical levels that change an original hierarchical structure of the mixed-signal electronic design. In some of the first embodiments, the act of implementing the mixed-signal electronic design using updated standardized power data including the illegal signal is performed without using a translator module to translate the illegal signal to another form that is recognized by a standardized power format framework for the standardized power format. In addition or in the alternative, the illegal signal is not recognized by a standardized power format framework for the standardized power format and comprises at least one of a power control signal or an expression including the illegal signal to implement power intent for the mixed-signal electronic design.

In some of the first embodiments, the method may further comprise the act of processing power related content in the mixed-signal electronic design using one or more native processes or modules in a standardized power format framework for the standardized power format and the act of performing virtual port mapping for a port of a circuit design block in the mixed-signal electronic circuit to generate a virtual port for the port. In some of the immediately preceding embodiments, the method may further include the act of instantiating an instance of the circuit design block in the mixed-signal electronic design using the virtual port, rather than the port in the circuit design block and the act of performing one or more analyses for the mixed-signal electronic circuit using the updated power data including the illegal signal and the instance of the circuit design block, wherein the act of implementing the mixed-signal electronic design also uses the instance of the circuit design block. In some of the immediately preceding embodiments, the one or more analyses comprise at least one of design modeling, design synthesis, schematic design implementation, schematic level simulation, physical design implementation, post-layout optimization, functional verification including one or more of formal verification, logic simulation, and intelligent verification, analog verification, physical verification including design rule check, layout versus schematic check, exclusive OR check, electrical rule check, and antenna checks, one or more simulations, or one or more analyses including timing analysis, static timing analysis, and power network analyses.

In some second embodiments of the first embodiments, the act of identifying, generating, or modifying the standardized power data in the standardized power format with the illegal signal in the mixed-signal electronic design may include the act of parsing at least a part of the standardized power data in the standardized power format including the illegal signal, the act of maintaining one or more pertinent elements of the at least a part of the standardized power data in one or more databases, and the act of evaluating the at least a part of the standardized power data. In some of the second embodiments, the act of parsing at least a part of the standardized power data may comprise the act of identifying an object from the at least a part of the standardized power data, the act of determining whether the object includes a legal signal that is recognized in a standardized power format framework for the standardized power data, the act of determining whether the object includes a legal expression that is recognized in the standardized power format framework for the standardized power data, and the act of identifying a first database from the one or more databases for the object.

In some of the immediately preceding embodiments, the act of determining whether the object includes the legal signal may include the act of determining whether the object includes a switch module, the act of determining whether the object includes a legal mixed-signal, and the act of determining whether the object includes a legal expression recognized by an extension to the standardized power format. In some of the second embodiments, the act of maintaining the one or more pertinent elements may include the act of identifying a first element from the one or more pertinent elements of the at least a part of the power data, the act of determining whether the first element includes a legal signal for the standardized power format, the act of identifying a first database from the one or more databases for the first element, and the act of determining whether there exists a second element in the one or more pertinent element.

In some of the immediately preceding embodiments, the act of maintaining the one or more pertinent elements may include the act of identifying the second element from the one or more pertinent elements of the at least a part of the power data, the act of determining whether the second element includes an illegal signal for the standardized power format, and the act of identifying a second database from the one or more databases for the second element. In some of the second embodiments, the act of evaluating the at least a part of the standardized power data may include the act of identifying or determining a change in a signal of the one or more pertinent elements, the act of identifying or determining an expression associated with the signal, and the act of determining whether the expression includes a combination of a legal element and an illegal element.

In some of these immediately preceding embodiments, the act of determining whether the expression includes the combination of the legal element and the illegal element may comprise the act of identifying the legal element from the combination, wherein the expression is determined to include the combination of the legal element and the illegal element, the act of evaluating the legal element by using one or more native processes or modules that are built into a standardized power format framework for the standardized power data to determine a first evaluation result for the legal element, the act of excluding the legal element from the combination, the act of providing the first evaluation result to the standardized power format framework to use the one or more native processes or modules that are built into the standardized power format framework to evaluate the combination, and the act of performing power processing for the mixed-signal electronic design.

In some embodiments, the act of determining whether the expression includes the combination of the legal element and the illegal element may comprise the act of identifying the illegal element from the combination, the act of evaluating the illegal element by using an evaluation to determine a second evaluation result for the illegal element, wherein the illegal element is not recognized by one or more native processes or modules that are built into a standardized power format framework for the standardized power data, the act of providing the second evaluation result to the standardized power format framework to use the one or more native processes or modules that are built into the standardized power format framework to evaluate the combination, and the act of performing power processing for the mixed-signal electronic design.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
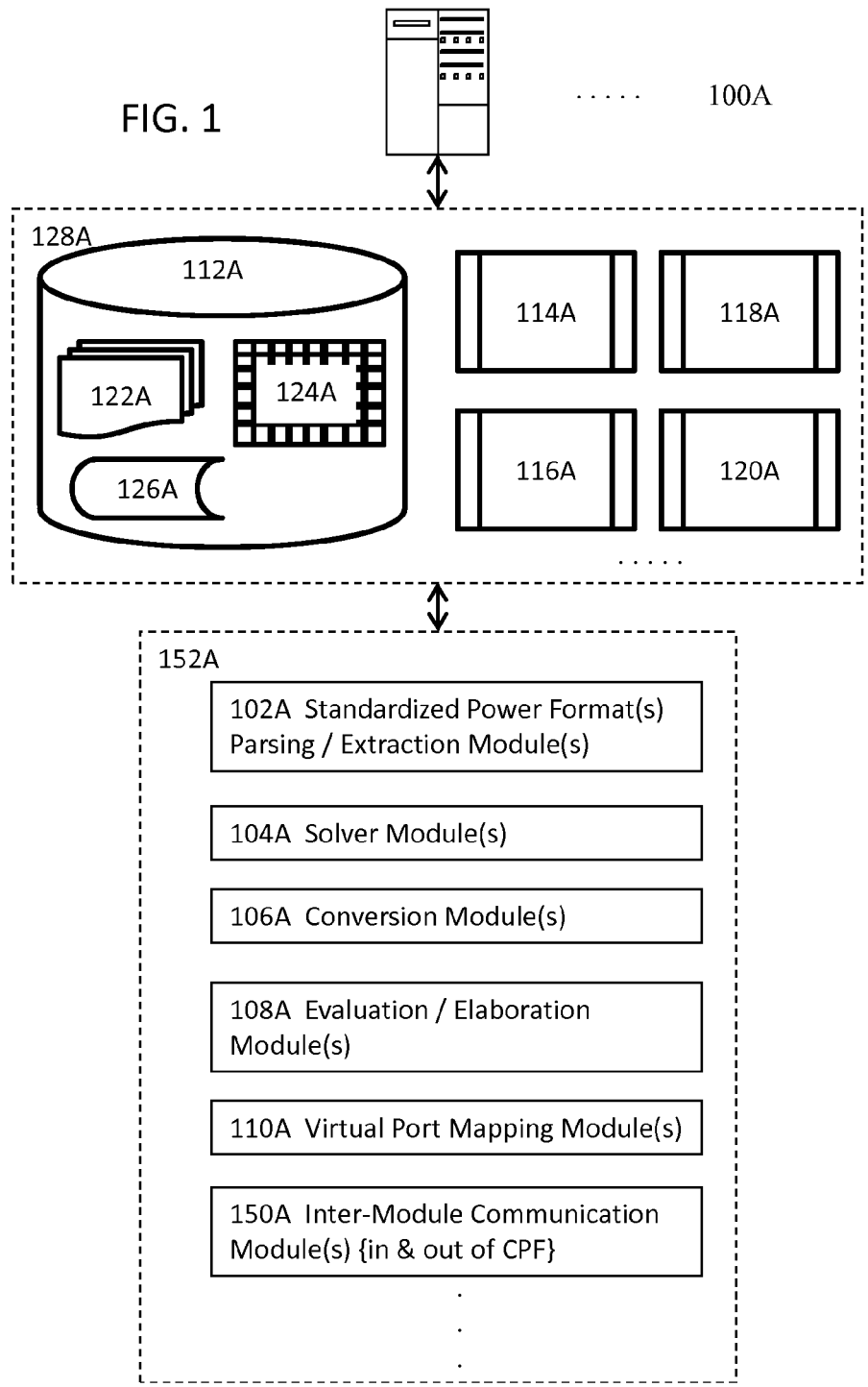
FIG. 1 illustrates a high level block diagram for a system for implementing mixed-signal electronic circuit designs with power data in standardized power formats in some embodiments.

Various embodiments are directed to methods, systems, and articles of manufacture for implementing mixed-signal electronic circuit designs with power data in standardized power formats. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are method(s), system(s), and article(s) of manufacture for implementing mixed-signal electronic circuit designs with power data in standardized power formats in one or more embodiments. In some embodiments, a computer system executing various modules described herein may execute the method for directly specifying or using standardized power data in one or more standardized formats (e.g., the Common Power Format or CPF, Unified Power Format or UPF, etc.) in various design tasks for implementing mixed-signal electronic designs by using one or more native processes or modules that are built into one or more standardized power format frameworks to evaluate legal signals and expressions to generate the first output. The method may also use one or more evaluation or elaboration processes or modules to evaluate illegal or incompatible signals or expressions, which are not recognized in standardized power format frameworks, to generate the second output for various design tasks.

The method thus incorporate standardized power data in one or more standardized power format into various design tasks, without using wrappers to encapsulate circuit blocks generating illegal or incompatible signals or expressions and hence disrupt the original design hierarchical structures by adding one or more hierarchies for the wrappers. The method thus also incorporate standardized power data in one or more standardized power format into various design tasks, without using any translators to translate illegal signals or expressions into corresponding legal or incompatible signals or expressions for various standardized power format frameworks. The methods or systems may also evaluate combinations of both legal or compatible as well as illegal or incompatible signals and expressions by forwarding both the first and second outputs to standardized power format frameworks to use their native processes or modules to evaluate the combinations, without using any wrappers or translators for circuit design blocks that generate illegal or incompatible signals or expressions.

FIG. 1 illustrates a high level block diagram for a system for implementing mixed-signal electronic circuit designs with power data in standardized power formats in some embodiments. In one or more embodiments, the system for FIG. 1 illustrates a high level block diagram for a system for implementing mixed-signal electronic circuit designs with power data in standardized power formats may comprise one or more computing systems 100A, such as a general purpose computer described in the System Architecture Overview section to implement one or more special proposes.

In some embodiments, the one or more computing systems 100A may invoke various system resources such as the processor(s) or processor core(s), memory, disks, etc. The one or more computing systems 100A may also initiate or interact with other computing systems to access various resources 128A that may comprise a global routing engine and/or a detail routing engine 114A, a layout editor 116A, a design rule checker 118A, a verification engine 120A, various synthesis tools (e.g., behavior synthesis tools, logic synthesis tools, etc.), and various simulation engines, etc. The one or more computing systems 100A may further write to and read from a local or remote volatile or non-volatile, non-transitory computer accessible storage media 112A that stores thereupon data or information such as, but not limited to, one or more data structures, tables, lists, databases (124A) (collectively database or databases hereinafter) such as various design databases including schematic design database(s) and physical design database(s).

The database 124A may also include solver databases storing solutions or results of various evaluation or elaboration of various solvers (e.g., matrix solver(s), SPICE, various simulator(s), etc. for solving electronic circuits) in some embodiments. The database 124A may, in addition or in the alternative, include sensitivity database(s) and associated modules to manipulate the sensitivity database(s). The local or remote volatile or non-volatile computer accessible storage 112A may further store thereupon power data files comprising a file in the Common Power Format (CPF), the Unified Power Format (UPF), or other similar formats, libraries such as design rule decks, constraints, requirements, standard cell reference libraries, basic libraries, design libraries, basic libraries, etc. (122A), or other information or data (126A) that may be used to facilitate the performance of various functions to achieve the intended purposes.

In some embodiments, the one or more computing systems 100A may, either directly or indirectly through various resources 128A to invoke various software, hardware modules or combinations thereof 152A that may comprise one or more standardized power format modules 102A to manipulate various data or information in one or more files or records in one or more standardized power formats for electronic designs, one or more solver modules 104A to solve for steady state or transient solutions for electronic designs or one or more conversion modules 106A to convert values in a first format or domain into values in a second formation or domain (e.g., from a wreal signal into real number(s), from a real nettype to real number(s), from an electrical signal into real number(s), etc.) The one or more conversion modules 106A may include, for example but not limited to, matrix solver(s), digital, analog, or mixed-signal simulator(s), etc. that are used to determine or calculate voltage values or current values of nodes in an electronic circuit design.

In some embodiments, the various software, hardware modules or combinations thereof 152A may comprise one or more evaluation or elaboration modules 108A to evaluate various expressions, conditions, or statements, etc. or to elaborate portions of electronic circuit designs, one or more virtual port mapping modules 110A to map an actual port of a block of an electronic circuit design to a virtual port, one or more inter-module communication modules 150A to transmit various data or information between two modules such as a solver module 106A and a standardized power format module 102A. For example, an evaluation or elaboration module 108A may evaluate an electrical signal, a wreal signal, or a real signal to determine the logic output of a logic condition, statement, or expression (hereinafter expression collectively) including the electrical signal, a wreal signal, or real signal. For example, an evaluation or elaboration module 108A may be used to evaluate whether the value of a real-valued shutoff signal, pmc2.pso, is less than 1.0V to determine whether the logic output of the condition (pmc2.pso<1.0).

Figure 2:
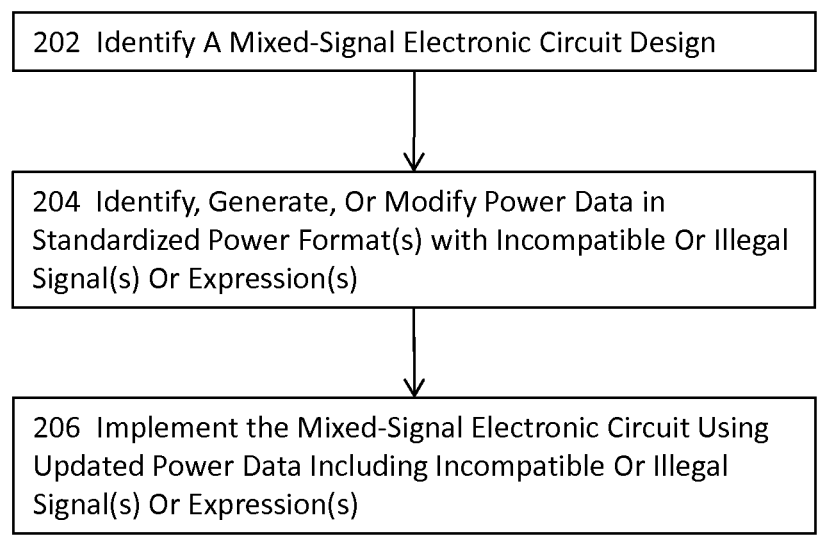
FIG. 2 illustrates a high level flow diagram for implementing mixed-signal electronic circuit designs with power data in standardized power formats in some embodiments.

A wreal signal is a 4-state real valued discrete signal including, for example, "0.0", "non-zero", "wrealXstate" (unknown state), and wrealZstate (high-impedance state) in SystemVerilog Hardware Description Language in some embodiments. Real-valued signals may also include the real data type, an array of real as an extension to the real data type, string data type, electrical signals, integer data type, genvar data type, parameter data type as found in IEEE standard 1364-2005 Verilog HDL, nettypes (e.g., nettypes in Verilog-AMS) with real data values, a SystemVerilog real data type, or any other data types having a real-valued component, instead a purely logic signal, and will be collectively referred to as a real-valued signal or real-valued signals hereinafter. In some embodiments, an electrical signal includes a signal that results from or is derived from physics (e.g., from the Kirchhoff circuit laws or from Maxwell equation with physical data as input, etc.), rather than a signal that exists FIG. 2 illustrates a high level flow diagram for implementing mixed-signal electronic circuit designs with power data in standardized power formats in some embodiments. In one or more embodiments, the method or system illustrated in FIG. 2 may include the respective process or module 202 for identifying a mixed signal electronic design. Throughout the description, a mixed-signal electronic circuit design includes at least a portion of an analog design, an analog/mixed-signal design, or a digital/mixed-signal design, unless otherwise specifically recited or claimed. In these embodiments, the method or system illustrated in FIG. 2 may include the respective process or module 204 for identifying from the existing, generating from scratch, or modifying some existing power data in one or more standardized power formats such as the Si2 Common Power Format, the IEEE Unified Power Format, or any other standardized power formats that are promulgated to specify power data.

For example, process or module 204 may annotate an electronic circuit design with new power data or add new power data into a standardized power format file, may modify existing power data annotated in an electronic circuit design or existing power data stored in a standardized power format file, or identify existing power data that are still applicable or pertinent. Power data may include, for example, but not limited to, data or information for power domains, a plurality of states or modes (collectively states hereinafter) of a power domain such as on/off state, normal state, standby mode, sleep mode, etc., implementation details or control features of electronic designs consistent with the power intent, etc. Power intent may be specified for a power domain, a block (e.g., an IP or intellectual property block) of electronic circuit designs, a cell (e.g., a parameterized cell), or a component of electronic designs in some embodiments.

In some embodiments, constructs expressing power domains and their respective power supplies (e.g., constructs for manipulating different data or libraries for scenarios where a cell is used in different power domains, constructs for specifying hierarchical modules as belonging to specific power domains, constructs for specifying explicit power or ground nets and connectivity for a cell, a block, or a component of electronic circuit designs) in some embodiments. In addition or in the alternative, power data may include specification for control logic such as specification for level shifter logic that automatically inserts needed cells when signals traverse between blocks in different power domains or blocks with different supply voltages, specification of switch logic, specification for state-retention logic to switch off blocks in a certain state, specification for transmitting control signals to certain ports, specification for logic needed for signals traversing between blocks that may be independently switched on and off, or specifications of any other needed or desired logic.

In some embodiments, the power data may include definitions of states or expressions for state transitions from one state to another state. In some embodiments, power data may include the specifications, commands, or arguments associated with respective commands for power supplies, power supply nets, a plurality of power states, power control devices (e.g., power switches, etc.), level shifters, transitions among a plurality of states, attributes (e.g., functional attributes of nets or power nets, etc.), etc. In some embodiments, the standardized power format framework may directly operate upon hierarchical designs having multiple hierarchies without flattening any of the multiple hierarchies as well as upon a flat design having all design details on the same level of the flat design. In the embodiments where the standardized power format framework operates upon hierarchical electronic circuit designs having multiple hierarchies, the standardized power format framework may perform various functions as described herein in a bottom-up or top-down manner.

In some of embodiments, the standardized power format framework may annotate electronic designs with the power data of the respective designs. In some embodiments, a standardized power format framework includes the processes, modules, specification, rules, standards, constructs, etc. that are defined by or are developed for the standards for the standardized power format framework to perform various tasks during various stages of design flows of electronic circuit designs. Some exemplary tasks may include, for example but not limited to, design modeling (e.g., behavior modeling, etc.) synthesis (e.g., behavior synthesis, logic synthesis, etc.), schematic design implementation and schematic level simulations, physical design implementation, post-layout optimization, various verifications (e.g., functional verification such as formal verification, logic simulation, intelligent verification, etc.), analog verification, physical verification such as design rule check, layout versus schematic, exclusive OR check, electrical rule check, antenna checks, etc.), various simulations (e.g., physical verification, functional verification, design rule checking, etc.), various analyses (e.g., timing analysis, static timing analysis, power network analyses, etc.), etc.

In these embodiments, the method or system illustrated in FIG. 2 may include the respective process or module 206 for implementing the mixed-signal electronic circuit design by using updated power data that are identified, generated, or modified at 204. In some of these embodiments, implementing the mixed-signal electronic circuit design may include, for example but not limited to, design modeling (e.g., behavior modeling, etc.) synthesis (e.g., behavior synthesis, logic synthesis, etc.), schematic design implementation and schematic level simulations, physical design implementation, post-layout optimization, various verifications (e.g., functional verification such as formal verification, logic simulation, intelligent verification, etc.), analog verification, physical verification such as design rule check, layout versus schematic, exclusive OR check, electrical rule check, antenna checks, etc.), various simulations (e.g., physical verification, functional verification, design rule checking, etc.), various analyses (e.g., timing analysis, static timing analysis, power network analyses, etc.), etc. In some embodiments, implementing the mixed-signal electronic circuit design may also include the automatic insertion of power control features by the standardized power format framework or the checking by the standardized power format framework to determine whether the results of an electronic circuit design at a certain stage match the power data (e.g., power intent).

Figure 2A:
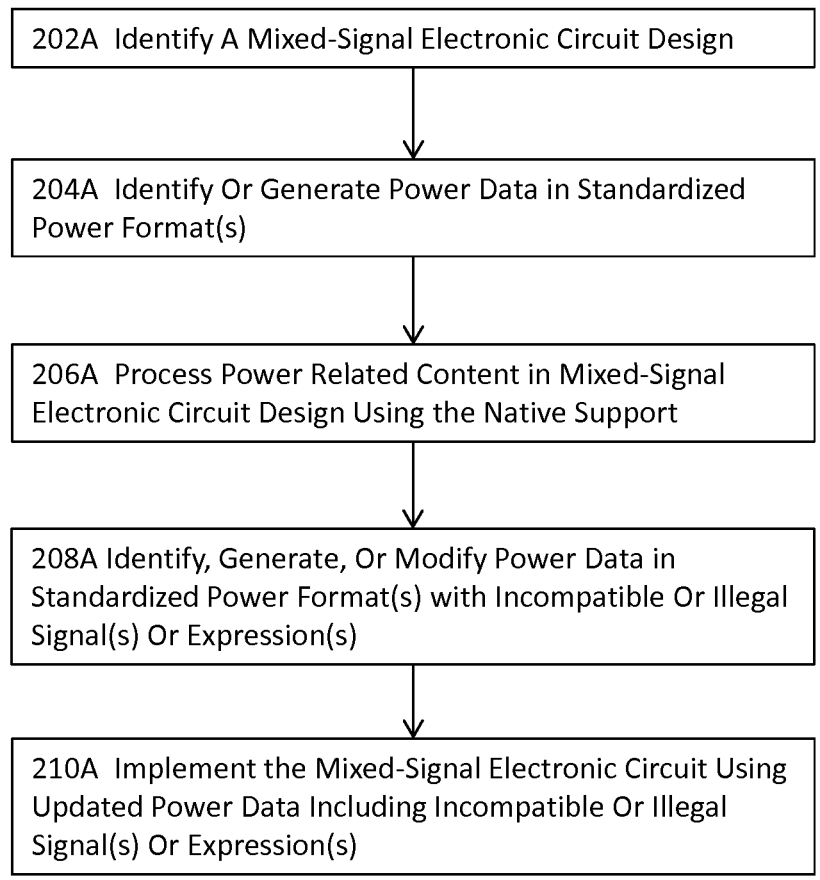
FIG. 2A illustrates a more detailed flow diagram for implementing mixed-signal electronic circuit designs with power data in standardized power formats in some embodiments.

FIG. 2A illustrates a more detailed flow diagram for implementing mixed-signal electronic circuit designs with power data in standardized power formats in some embodiments. In one or more embodiments, the method or system illustrated in FIG. 2A may include the respective process or module 202A for identifying a mixed-signal electronic circuit design in substantially similar manners as that described for 202 of FIG. 2. In some embodiments, the method or system may include the respective process or module 204A for identifying from the existing or generating from scratch in one or more standardized power formats such as the Si2 Common Power Format, the IEEE Unified Power Format, or any other standardized power formats that are promulgated to specify power data in substantially similar manners as those described for 204 of FIG. 2. In these embodiments, process or module 204A may, depending upon whether or not some power data exist for an electronic circuit design of interest, either identify such power data from the existing sources (e.g., a CPF file or a UPF file), generate the power data from scratch, or modify existing power data to reflect the required or desired power data for the electronic circuit design of interest.

In some embodiments, the method or system may include the respective process or module 206A for processing power related content in the mixed-signal electronic circuit design using native support within the framework of the standardized power formats. In some of these embodiments, process or module 206A may invoke various resources to parse, compile, interpret, translate, or map ("parse" collectively) the power data for various purposes described herein. Process or module 206A may leverage, for example, the parsing or extraction process or module 102A and various libraries or data in the local or remote volatile or non-volatile, non-transitory computer accessible storage media 112A to parse a CPF or UPF file.

For example, process or module 206A may reference various syntax or semantics libraries or data stored in 112A or associated with 102A to parse the condition "-shutoff_condition {!pmc1.pso && pmc2.pso<1.0} and correctly determine that this condition, based on the syntax in the condition, is a CPF condition and invokes, for example, the parser that is built into the CPF framework to parse the first portion (!pmc1.pso) that the CPF framework recognizes and the second portion (pmc2.pso<1.0) that the CPF framework does not recognize (because the second portion is non-logic and is not recognized in CPF). Process or module 206A may further resolve the first portion by using the CPF built-in parser and invoke a solver 104A to resolve the second portion. Process or module 206A may further invoke the inter-module communication modules 150A to communicate, for example, the first portion to the CPF built-in module and the second portion to the solver module 104A and also to communicate the Boolean outputs (in this example, both outputs are Boolean) of both the CPF built-in parser and the solver 104A back to the CPF framework to determine whether the shutoff condition is met in this example.

The framework for a conventional standardized power format (e.g., CPF or UPF) only recognizes a certain type of data (e.g., logic data type in CPF) and thus cannot handle incompatible expressions (e.g., non-logic signals or expressions for CPF). One of the advantages of various embodiments is that various embodiments may directly use the real-valued signals or signal values in the standardized power format files, without having to insert a translation module between the real-valued signals or signal values and the framework of the standardized power format. Another advantage of various embodiments is that various embodiments may directly use the real-valued signals or signal values in the standardized power format files, without adding any hierarchical levels to accommodate one or more wrappers that incorporate one or more blocks generating the real-valued signals or signal values and output only logic signals that are recognized by the standardized power format framework. In other words, various embodiments will not disrupt the original hierarchical structure of the mixed-signal electronic circuit design because these embodiments do not use a wrapper to wrap around real-valued signal generating circuit blocks to generate signals recognizable by the standardized power format framework.

In some embodiments, the method or system may include the respective process or module 208A for identifying from the existing, generating from scratch, or modifying some existing power data in one or more standardized power formats such as the Si2 Common Power Format, the IEEE Unified Power Format, or any other standardized power formats that are promulgated to specify power data in substantially similar manners as those described for 202 of FIG. 2. In some embodiments, the method or system may include the respective process or module 210A for implementing the mixed-signal electronic circuit design by using updated power data that are identified, generated, or modified at 208A in substantially similar manners as those described for 206 of FIG. 2.

Figure 2B:
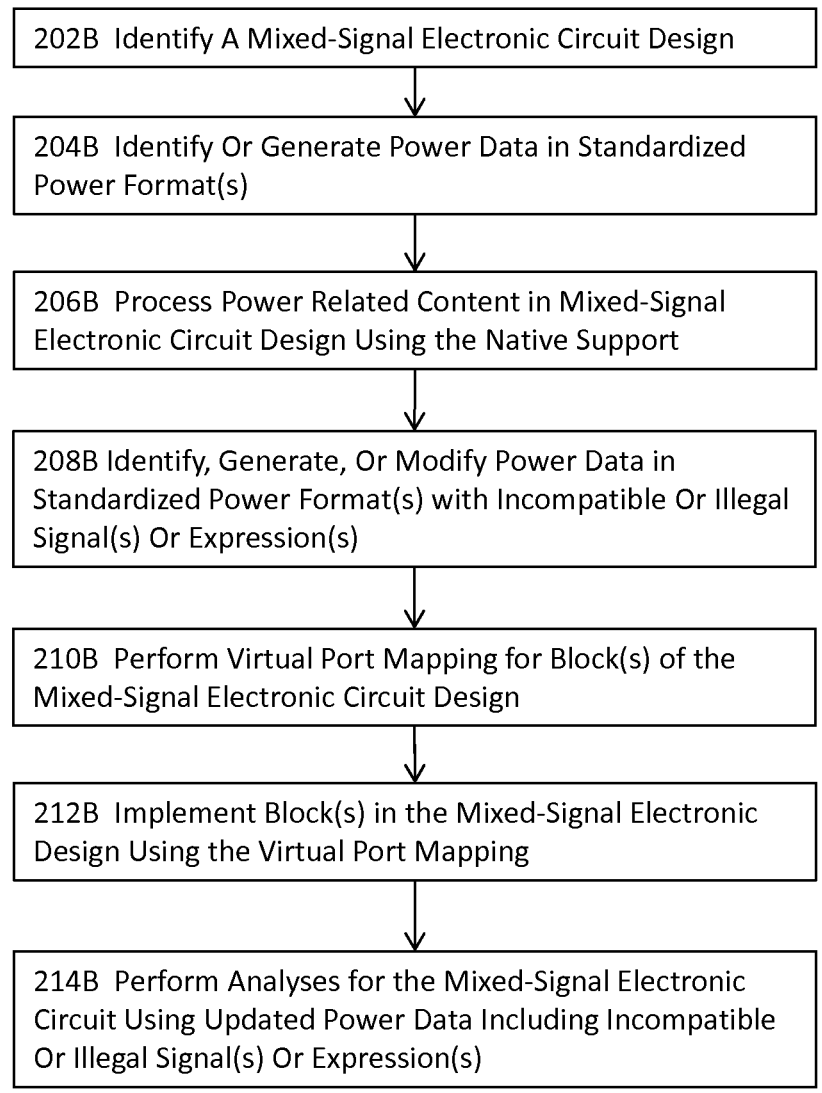
FIG. 2B illustrates a more detailed flow diagram for implementing mixed-signal electronic circuit designs with power data in standardized power formats in some embodiments.

FIG. 2B illustrates a more detailed flow diagram for implementing mixed-signal electronic circuit designs with power data in standardized power formats in some embodiments. In one or more embodiments, the method or system illustrated in FIG. 2B may include the respective process or module 202B for identifying a mixed signal electronic design. 202B may be performed in substantially similar manners as those described for 202 of FIG. 2. In some embodiments, the method or system may include the respective process or module 204B for identifying from the existing, generating from scratch, or modifying some existing power data in one or more standardized power formats such as the Si2 Common Power Format, the IEEE Unified Power Format, or any other standardized power formats that are promulgated to specify power data in substantially similar manners as those described for 204 of FIG. 2.

In some embodiments, the method or system may include the respective process or module 206B for processing the content of the mixed-signal electronic circuit design. In some embodiments, process or module 206B may process the content of the mixed-signal electronic circuit design by using native support or functions that are built into the standardized power format framework such as the CPF parser or the Tcl (Tool Command language) procs for parsing elements of a UPF file (e.g., command arguments in a UPF file). In some embodiments, the method or system may include the respective process or module 208B for identifying from the existing, generating from scratch, or modifying some existing power data in one or more standardized power formats such as the Si2 Common Power Format, the IEEE Unified Power Format, or any other standardized power formats that are promulgated to specify power data in substantially similar manners as those disclosed for 204 of FIG. 2.

In some embodiments, the method or system may optionally include the respective process or module 210B for performing virtual port mapping for one or more blocks of the mixed-signal electronic circuit design. In some embodiments, process or module 210B performs the virtual port mapping by using, for example, the "-port_mapping" option (e.g., for the "set_instance" command) in CPF or the "-port_map" key in CPF to map a real or actual port to a virtual port. In various embodiments, a port may include one or more pins such as power pin(s), ground pin(s), signal pin(s), etc. It shall be noted that a port may nonetheless be used interchangeably throughout this application, unless otherwise specifically used or recited. For example, the CPF option "-port_mapping" in the CPF "set_instance" command defines the connection between a pin of a specified instance and a pin or port that is visible in the current scope.

In some embodiments, real-valued expressions or signals may be specified in the virtual port definition of, for example, the "-port_mapping" option. In some of these embodiments, process or module 210B performs the virtual port mapping for a block such that, when the design configuration changes for the block, or when the block is instantiated in different places, the internal design of the block remains unchanged. An example is provided below to demonstrate the creation and use of a virtual port "virpso" in a CPF "set_design" block. When the design is instantiated in, for example, the CPF "set_instance" command, the virtual port is mapped to a condition expression that may include purely logic signals, non-logic signals, or any combinations thereof. In the example provided below, the virtual port "virpso" is mapped to condition expression ({virpso pmc.vsup<0.2}) that includes a real-valued signal as indicated by the real number 0.2 in the condition expression.

```
set_instance digInst -port_mapping {{virpso pmc.v-
   sup<0.2}}
set_design dig_child -ports {virpso}
create_power_domain -name PD0
create_power_domain -name PD1 -shutoff_condition
   virpso end_design
```

It shall be noted that the following example also demonstrates that various embodiments described herein also provide native support for non-logic expression and combined expressions of logic and non-logic elements. In some embodiments, combined expressions of logic and non-logic elements may be used in scenarios where the power control signals may come from different blocks including logic and non-logic blocks and thus provide greater flexibility to design configurations than expressions supporting only the logic elements. An example is provided in FIG. 7 that will be described in greater details in its description in a subsequent section of the Detailed Description.

In some embodiments, the method or system may optionally include the respective process or module 212B for implementing the mixed-signal electronic circuit design by using updated power data that are identified, generated, or modified at 208B in substantially similar manners as those described for 206 of FIG. 2. In some embodiments, process or module 212B further implements the mixed-signal electronic circuit design by using the results of virtual port mapping performed at 2108 for the one or more blocks. In some embodiments, the method or system may optionally include the respective process or module 214B for performing one or more analyses for at least a part of the mixed-signal electronic circuit design using at least the identified, generated, or modified power data that include one or more signals or expressions that are considered incompatible or illegal in the standardized power format framework.

An illegal signal or expression is one that is prohibited or disallowed in a standardized power format framework. An incompatible signal or expression is one that cannot be recognized or understood by a standardized power format framework. For example, CPF is known to accept purely logic signals or expressions. Some embodiments described herein may nonetheless utilize non-logic signals or expressions or combinations of one or more logic and non-logic signals or expressions within the CPF framework, without using one or more wrappers for the blocks that generate the non-logic signals so as to disturb the original hierarchical structure of the electronic design (e.g., by adding a hierarchical level to accommodate the one or more wrappers) or having to insert a translator module to translate the non-logic signal or expression into a logic signal or expression so that the CPF framework (e.g., a CPF parser) will recognize such translated signals or expressions. Rather, these embodiments may directly use the real-valued signals or their values in the CPF.

Figure 2C:
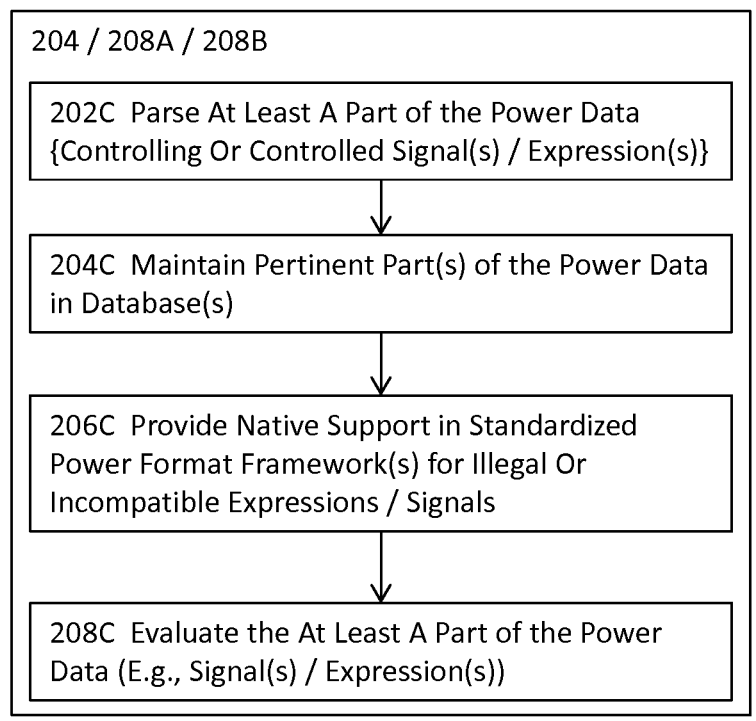
FIG. 2C illustrates a more detailed flow diagram for a process or module illustrated in FIGS. 2 and 2A-B in some embodiments.

FIG. 2C illustrates a more detailed flow diagram for a process or module illustrated in FIGS. 2 and 2A-B in some embodiments. More specifically, FIG. 2C illustrates more details about process or module 204, 208A, or 208B in some embodiments. In some of these embodiments, process or module 204, 208A, or 208B may include sub-process or sub-module 202C for parsing at least a part of the power data. In some of these embodiments, process or module 204, 208A, or 208B may parse, for example, one or more expressions (e.g., controlling expressions, controlled expressions, etc.), specification, one or more signals, or any other part of one or more files in one or more standardized power formats that is required or desired for performing subsequent tasks (e.g., simulation, verification, implementation, or modeling of an electronic circuit design).

In these embodiments, the sub-process or sub-module may leverage or reference various data or libraries stored in, for example, 112A to parse the power data. The various data or libraries may include, for example but not limited to, various syntaxes, semantics, constructs, processes, rules or requirements for syntaxes, semantics, or constructions of legal power data, terminology, definitions, general and specific commands, etc. for one or more standardized power format framework (e.g., the CPF framework, the UPF framework, etc.) For example, upon receiving or identifying a CPF file including the option "-shutoff_condition {!pmc1.pso && (pmc2.pso<1.0)}", process or module 204, 208A, or 208B may invoke the relevant data or libraries for the CPF framework to parse the option such that the option in the CPF can be further processed.

In some of these embodiments, process or module 204, 208A, or 208B may include sub-process or sub-module 204C for maintaining pertinent parts or elements of the parsed power data in one or more databases. In some of these embodiments, the one or more databases include one or more sensitivity lists, each of which includes a sensitivity database (e.g., a sensitivity list, table, or database) for storing pertinent portions of interest of the power data. In some embodiments, the one or more databases may include a first sensitivity list to store signals that are, by default, recognizable by a standardized power format framework and a second sensitivity list to store signals that are, by default, recognizable by a standardized power format framework.

In some embodiments, the sub-process or sub-module 204C may store all the signals that are recognizable by multiple standardized power format frameworks in a single, first database and all the signals that are not recognizable by any of the multiple standardized power format frameworks in a single, second database. In some other embodiments, the sub-process or sub-module 204C may store all the recognizable signals in a single, first database for each standardized power format framework and all the non-recognizable signals in a single, second database for each standardized power format framework. In the above example with the option "-shutoff_condition {!pmc1.pso && (pmc2.pso<1.0)}", the sub-process or sub-module 204C may, for example, store the first signal "pmc1.pso" or the first expression "!pmc1.pso" in a first database that stores all the expressions, signals, etc. that are recognized by the CPF framework.

The sub-process or sub-module 204C may further store the second real-valued signal "pmc2.pso" or the second expression "pmc2.pso<1.0" in a second database that stores all the expressions, signals, etc. that are not natively recognized by the CPF framework. In some embodiments, any data or object (e.g., signals, expressions, etc.) in one or more of these databases may further be linked to one or more other databases that store various circuit elaboration results, steady or transient state solutions of various electronic circuit designs, various states of various components in electronic circuit designs, transitions among various states of one or more circuit components in electronic circuit designs, etc. at various time points or stages of these electronic circuit designs.

In these embodiments, modules or processes accessing these one or more databases may further reference the one or more linked databases to, for example, retrieve the desired or required elaboration results or circuit solutions. For example, a CPF parser may reference the one or more databases to retrieve a solution for the "pmc1.pso" signal at a particular stage, a particular state, or a particular time point to evaluate the expression "!pmc1.pso". As another example, a wreal expression evaluation module (e.g., 108A) or a solver module (e.g., 104A) may access such linked database(s) to retrieve a solution for the wreal signal pmc2.pso to evaluate the wreal expression "pmc2.pso<1.0". In some of these embodiments, a pointer, a linking structure, or a symbolic link structure may be used to link various databases or data objects thereof together.

In some of these embodiments, process or module 204, 208A, or 208B may include sub-process or sub-module 206C for providing native support in one or more standardized power format frameworks for illegal or incompatible data including, for example, non-logic expressions, non-logic signals, etc. for the CPF framework. In some of these embodiments, sub-process or sub-module 206C provides native support without using one or more wrappers for the blocks that generate the legal or compatible signals so as to disturb the original hierarchical structure of the electronic design (e.g., by adding one or more hierarchical levels to accommodate the one or more wrappers) or having to insert a translator module to translate the illegal or incompatible signal or expression into a legal or compatible signal or expression so that the standardized power format framework (e.g., a CPF parser) will recognize such translated signal or expression. Rather, these embodiments may directly use the illegal or incompatible signals, their values, or expressions in the standardized power format framework.

In these embodiments, process or module 204, 208A, or 208B may include sub-process or sub-module 208C for evaluating the at least a part of the power data. In some embodiments, process or module 208C evaluates or elaborates the signals or expressions. In these embodiments, the signals or expressions include legal and compatible signals or expressions as well as illegal and incompatible signals and expressions for one or more standardized power format frameworks. In some of these embodiments, sub-process or sub-module 208C may directly use the native support in a standardized power format framework to evaluate or elaborate the legal or compatible portion of any expressions, regardless of the illegality or incompatibility of the remaining portion of such expressions.

In the example provided above, the option include a legal or compatible portion "pmc1.pso" (or "!pmc1.pso") and an illegal or incompatible portion "pmc2.pso" (or "pmc2.pso<1.0"). In this example, sub-process or sub-module 208C may invoke, for example, the CPF parser to evaluate the legal or compatible portion "pmc1.pso" (or "!pmc1.pso"). In some embodiments where an appropriate external evaluation or elaboration module is available for an illegal or incompatible portion, the sub-process or sub-module 208C may invoke the appropriate external evaluation or elaboration module to evaluate or elaborate the illegal or incompatible portions. An external evaluation or elaboration module includes such a module developed by a third-party that is different from one or more developers of various processes or modules described herein.

In the aforementioned example, the sub-process or sub-module 208C may invoke the Verilog-AMS parser to evaluate the illegal or incompatible portion "pmc2.pso<1.0". In some of these embodiments, the appropriate external evaluation or elaboration module may further reference the one or more linked databases to determine the wreal value of "pmc2.pso" to evaluate the condition "pmc2.pso<1.0" in order to determine the logic output which is now recognized by the standardized power format framework and thus may be further transmitted to the standardized power format framework to determine the output of "!pmc1.pso&&(pmc2.pso<1.0)" together with the evaluation or elaboration results of "!pmc1.pso" from the standardized power format framework.

In some other embodiments where no appropriate external evaluation or elaboration modules exist, the sub-process or sub-module 208C may further invoke one or more internal solver modules (e.g., 104A), one or more internal evaluation or elaboration modules (e.g., 108A) to evaluate the illegal or incompatible portion. For example, the sub-process or sub-module 208C may invoke a matrix solver, SPICE, or any other appropriate solvers, evaluation modules, or elaboration modules to evaluate the illegal or incompatible portion. In some of these embodiments, these one or more internal solver modules, evaluation modules, or elaboration modules may further function in conjunction with the one or more linked databases described above to look up the desired or required results for the incompatible or illegal portion without going through the more expensive solution, evaluation, or elaboration process.

In the aforementioned embodiments, the sub-process or sub-module 208C evaluates both the legal and illegal signals or expressions without using one or more wrappers for any blocks that generate the legal or compatible signals so as to disturb the original hierarchical structure of the electronic design (e.g., by adding one or more hierarchical levels to accommodate the one or more wrappers) or having to insert one or more translator modules to translate illegal or incompatible signals or expressions into legal or compatible signals or expressions so that the standardized power format framework (e.g., a CPF parser) will recognize such translated signal or expression. One of the advantages is that the actual values of incompatible or illegal signals or expressions can be directly used or even transmitted in the standardized power format framework as well as the annotations in electronic circuit designs without introducing additional wrappers or translators.

Figure 3:
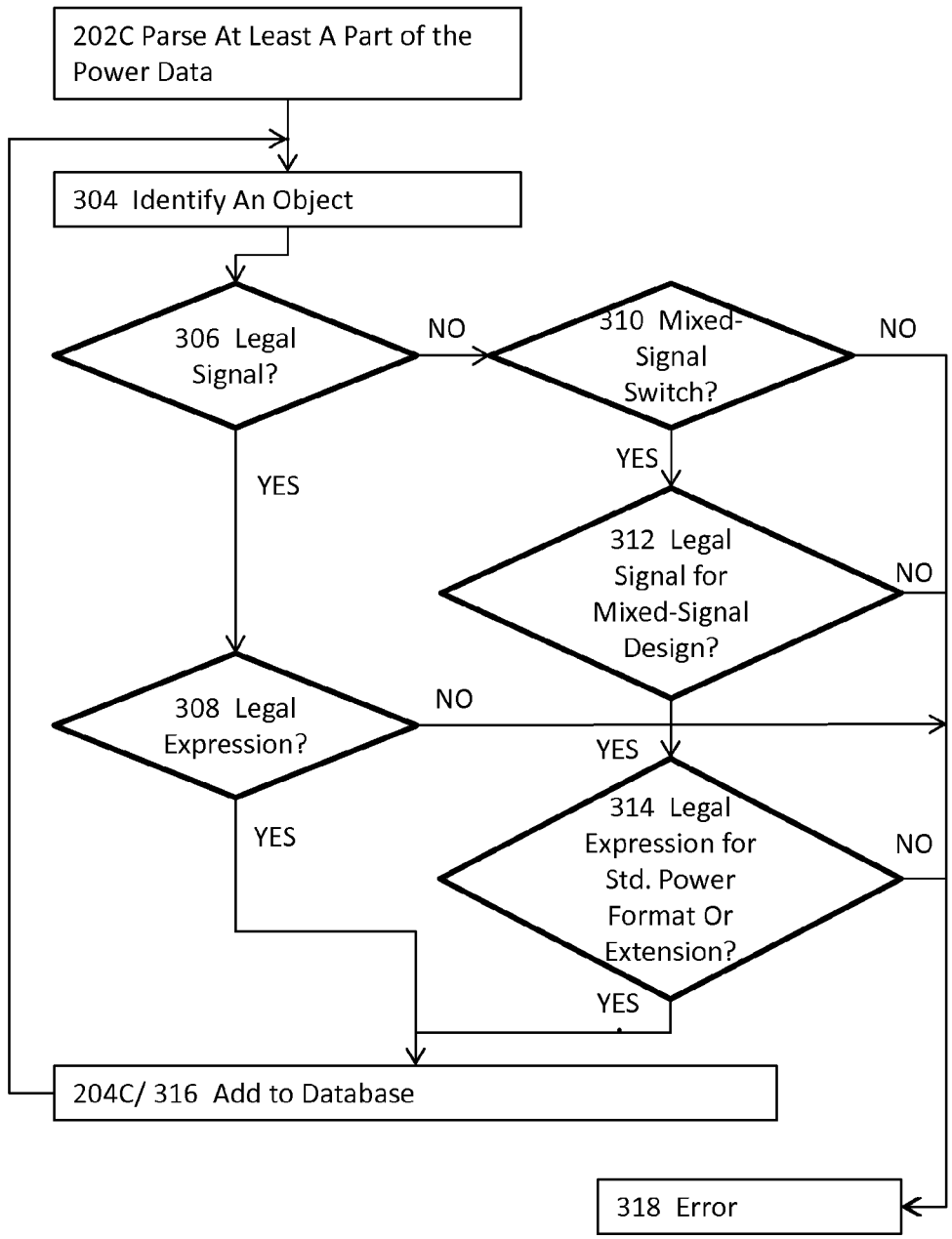
FIG. 3 illustrates more detailed flow diagram for a process or module illustrated in FIG. 2C in some embodiments.

FIG. 3 illustrates more detailed flow diagram for a process or module illustrated in FIG. 2C in some embodiments. More specifically, FIG. 3 illustrates more detailed flow diagram for the method or system 202C in some embodiments. The method or system 202C may leverage or reference various data or libraries stored in, for example, 112A to perform various functions described herein. The various data or libraries may include, for example but not limited to, various syntaxes, semantics, constructs, processes, rules or requirements for syntaxes, semantics, or constructions of legal power data, terminology, definitions, general and specific commands, etc. for one or more standardized power format framework (e.g., the CPF framework, the UPF framework, etc.) In these embodiments, the process or module 202C for parsing at least a part of the power data includes the process or module 304 for identifying an object. An object may include a part of the power data such as a signal, an expression, etc.

in some of these embodiments. Moreover, an object may or may not necessarily include an object in the programming paradigm of object-oriented programming. In other words, an object may include an object in the context of object-oriented programming in some embodiments or simply a smaller portion of a file in a standardized power format in some other embodiments. The method or system may further include determining whether or not the object identified at 304 comprises a legal signal, expression, or data for a standardized power format framework (e.g., the CPF framework or the UPF framework). For example, upon identifying the option "-shutoff_condition {!pmc1.pso && (pmc2.pso<1.0)}" as the identified object at 304, process or module 306 may first determine which standardized power format framework(s) is (are) to be used to process at least the identified object (e.g., a part of the option) and then leverage the relevant data or libraries for the appropriate standardized power format framework to determine the identified object is legal or compatible with the standardized power format framework.

For example, upon determining that the "-shutoff_condition" is an option under CPF, process or module 306 may use the relevant data or libraries for CPF to determine whether a first identified object (e.g., "!pmc1.pso") is compatible or legal within the CPF framework. In some embodiments where process or module 304 determines that the object identified at 304 is legal or compatible with the standardized power format framework, the method or system may proceed to 308 for determining whether the object identified at 304 includes any legal or compatible expression for a standardized power format framework. Otherwise, the method or system may proceed to process or module 310 for determining whether or not the object identified at 304 includes a mixed-signal switch as defined by a standardized power format framework.

In some embodiments where the method or system determines at 308 that the object identified at 304 includes an expression that is compatible or legal in the standardized power format framework, the method or system may further proceed to 204C or 316 to add the object identified at 304 to an appropriate database. In some embodiments where the method or system determines that the object identified at 304 does not include a legal or compatible expression for the determined standardized power format framework, the method or system may proceed to 318 to generate an error. In some embodiments where the method or system determines that the object identified at 310 does not include a mixed-signal switch under a standardized power format framework, the method or system may proceed to 318 to generate an error. In some other embodiments where the method or system determines that the object identified at 310 includes a mixed-signal switch under a standardized power format framework, the method or system may proceed to 312 to further determine whether the object identified at 304 includes a legal or compatible signal for a mixed-signal design under a publicly recognized analog or mixed-signal standard such as but not limited to an Analog/Mixed-Signal (AMS) or a Digital/Mixed-Signal (DMS) design.

In some embodiments, a legal or compatible signal includes a real signal, a wreal signal, a real nettype, or an electrical signal. In some embodiments where the method or system determines that the object identified at 304 does not include a legal signal, the method or system may proceed to 318 to generate an error. In some embodiments where the method or system determines that the object identified at 304 includes a legal signal, the method or system may proceed to 314 to further determine whether the object identified at 304 includes a legal or compatible expression under a standardized power format framework or one or more extensions therefor such as an extension to the CPF framework or another extension to the UPF framework. If the determination is affirmative at 314, the method or the system may also store the object identified at 304 into an appropriate database. Otherwise, the method or the system may proceed to 318 to generate an error.

In the aforementioned example, the method or system may, upon identifying the "pmc2.pso<1.0" as the object for processing at 304, determine that the object includes a mixed-signal switch at 310, that the object includes a legal or compatible signal "pmc2.pso" under Verilog-AMS at 312, and that the object includes a legal AMS expression for CPF at 314, the method or the system may thus store the object in an appropriate database. In some embodiments, the method or system may store a first object that is determined to include a legal signal at 306 and a legal expression at 308 as well as a second object that is determined not to be a legal signal at 306 in the same database. In some other embodiments, the method or system may store a first object (e.g., "pmc1.pso" which is logic) that is determined to include a legal signal at 306 and a legal expression at 308 as well as a second object (e.g., "pmc2.pso" which is wreal and thus non-logic and illegal in CPF) that is determined not to be a legal signal at 306 in two different databases.

Figure 4:
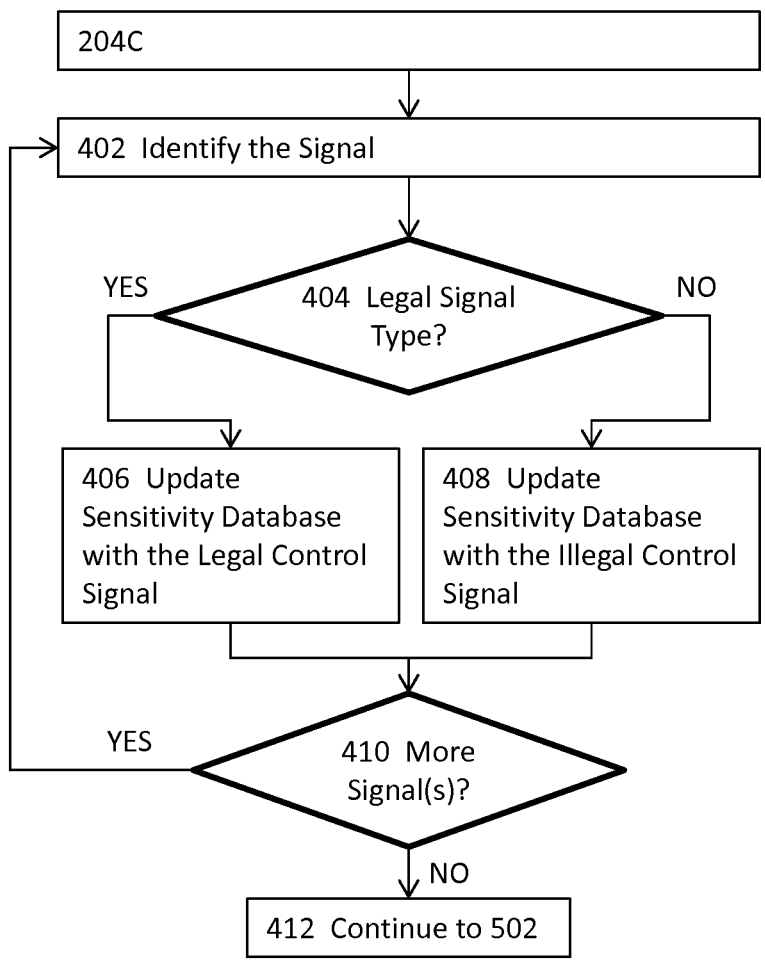
FIG. 4 illustrates more detailed flow diagram for a process or module illustrated in FIG. 2C in some embodiments.

FIG. 4 illustrates more detailed flow diagram for a process or module illustrated in FIG. 2C in some embodiments. More specifically, FIG. 4 illustrates a more detailed flow diagram for a method or system for maintaining at least a part of the power data in one or more databases. In some embodiments, the method or system may comprise the process or module 402 for identifying a signal from at least a part of the power data such as those described in 204C or 316. In some embodiments, the signal identified at 402 may comprise, for example but not limited to, a digital control signal from a logic representation (e.g., a Verilog representation) to a non-logic representation such as but not limited to a Verilog-AMS wreal, electrical (e.g., voltage or current values from Verilog-AMS, SPICE blocks, or Spectre blocks), SystemVerilog real nettype, transistor level SPICE or Spectre signals.

In the aforementioned example, the process or module 402 may identify, for example "pmc1.pso" or "pmc2.pso" from the power data of interest in some embodiments. In some embodiments, the method or system may comprise the process or module 404 for determining whether the signal identified at 402 is legal or compatible for a standardized power format framework. For example, the process or module 404 may determine that "pmc1.pso" is a logic and thus legal or compatible signal with the CPF framework, and that "pmc2.pso" is a wreal and thus illegal or incompatible signal with the CPF or UPF framework. In some embodiments where process or module 404 determines that the signal is legal or compatible, the method or system may proceed to process or module 406 for updating a first sensitivity database with the legal signal.

In some embodiments where process or module 404 determines that the signal is illegal or incompatible, the method or system may proceed to process or module 408 for updating a second sensitivity database with the legal signal. In some embodiments, the first sensitivity database and the second sensitivity database may be the same. In some other embodiments, the first sensitivity database and the second sensitivity database may constitute two different databases. For example, the method or system illustrated in FIG. 4 may store all the logic signals for the CPF framework in a first database and all the non-logic signals in a second database in some embodiments or store both the logic and non-logic signals for the CPF framework in the same database. At 410, the method or system may further determine whether there are more signals to process. If so, the method or system may return to 402 to identify the next signal and repeats 404-410. Otherwise, the method or system may proceed to 502 of FIG. 5 at 412.

Figure 5:
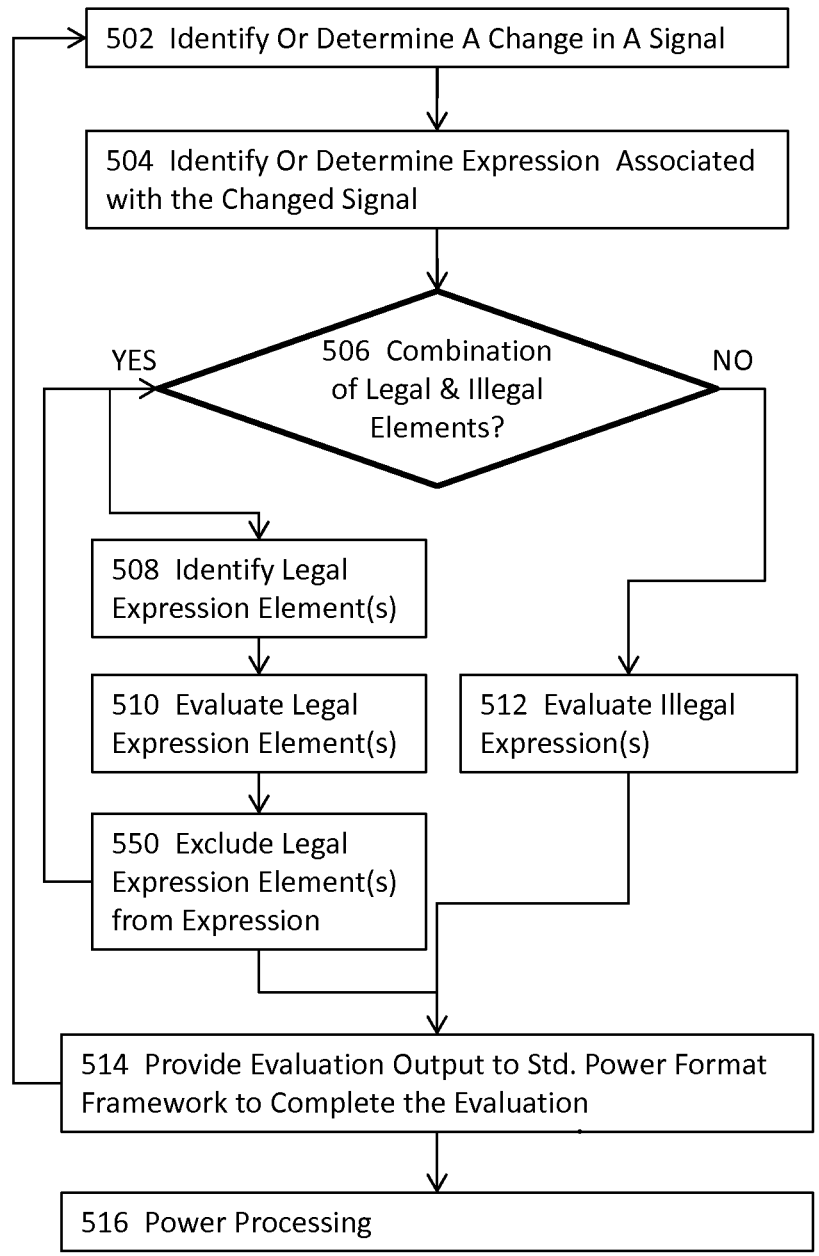
FIG. 5 illustrates more detailed flow diagram for a process or module illustrated in FIG. 2C in some embodiments.

FIG. 5 illustrates more detailed flow diagram for a process or module illustrated in FIG. 2C in some embodiments. More specifically, FIG. 5 illustrates a method or system for evaluating expressions for electronic designs in some embodiments. In some embodiments, the method or system illustrated in FIG. 5 may comprise the process or module 502 for identifying or determining a change in a signal. For example, process or module may identify a At 504, the method or system may further comprise the process or module for identifying or determining one or more expressions associated with the changed signal. In some embodiments, the one or more expressions include a Boolean expression.

In these embodiments, process or module 504 may identify or determine the one or more Boolean expressions associated with the signal identified or determined at 502 by using various data or libraries such as various syntaxes, semantics, constructs, processes, rules or requirements for syntaxes, semantics, or constructions of legal power data, terminology, definitions, general and specific commands, etc. for one or more standardized power format framework (e.g., the CPF framework, the UPF framework, etc.) In the example above, process or module 504 may identify or determine the Boolean expression "pmc2.pso<1.0" that is associated with the signal "pmc2.pso" by using data or libraries for the CPF framework. In some embodiments, the method or system may further include the process or module 506 for determining whether the expression includes a combination of one or more legal elements and one or more illegal elements with respect to one or more standardized power format frameworks.

In some embodiments where the process or module 506 determines that the expression includes a combination of one or more legal elements, the method or system may proceed to 508 to identify the one or more legal elements from the expression. In these embodiments, the method or system may further comprise the process or module 510 for evaluating the one or more legal elements by using the respective one or more standardized power format frameworks in which the one or more legal elements are considered legal or compatible. In some embodiments, process or module 510 may use the corresponding processes or modules described in FIG. 2C to evaluate the one or more legal elements.

In these embodiments, the method or system may further comprise the process or module 550 for excluding the identified one or more legal expression elements from the combination and return to process or module 506 to further determine whether the remains another legal expression element to be evaluated. In some other embodiments where the process or module 506 determines that the expression identified or determined at 504 includes one or more illegal or incompatible elements, the method or system may proceed to 512 to evaluate the one or more illegal or incompatible elements by using the corresponding processes or modules described in FIG. 2C. In some embodiments where the standardized power format frameworks include CPF or UPF, the one or more illegal or incompatible elements include one or more non-logic signals or expressions such as one or more real-valued signals as described in FIG. 1.

At 514, the method or system may then transmit the evaluation results of processes or modules 510 and/or 512 to the appropriate standardized power format framework(s) to complete the evaluation. In the example with the option "!pmc1.pso&&(pmc2.pso<1.0)", the method or system may process "!pmc1.pso" with the CPF framework to obtain the first output and "pmc2.pso<1.0" with, for example, a solver or an AMS parser to obtain the second output, transmit both the first output and the second output to the CPF framework, and complete the evaluation of "!pmc1.pso&&(pmc2.pso<1.0)". The method or the system may further include the process or module 516 for performing power processing that may include, for example but not limited to, various tasks described for FIG. 2 with power data specified in one or more standardized power formats in some embodiments.

Figure 6:
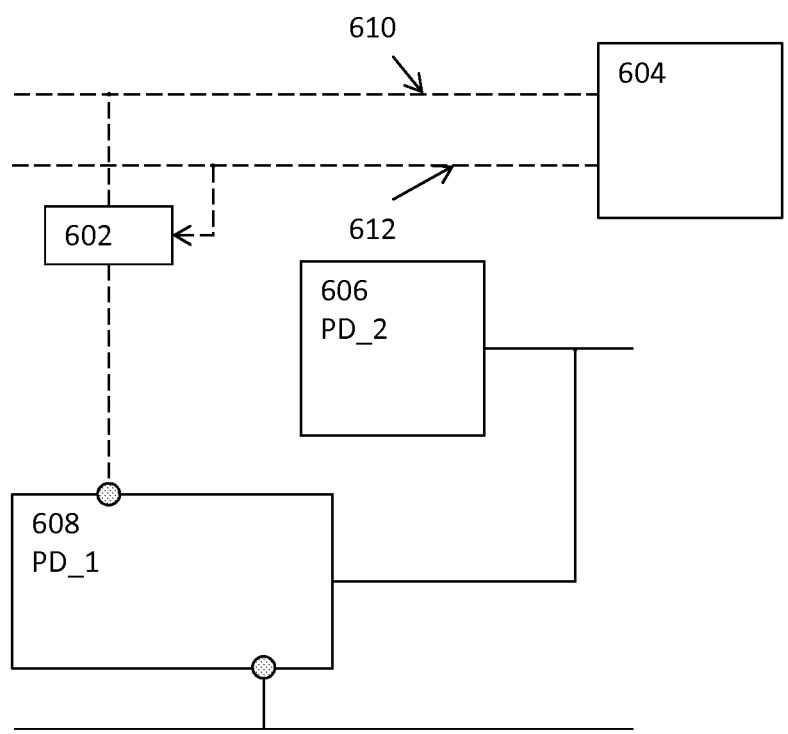
FIG. 6 illustrates a schematic diagram of an exemplary implementation of a part of an electronic circuit in accordance with some embodiments.

FIG. 6 illustrates a schematic diagram of an exemplary implementation of a part of an electronic circuit in accordance with some embodiments. More specifically, the exemplary implementation illustrates the capability of directly using illegal or incompatible signals in, for example, a CPF file in the CPF framework provided by some embodiments described herein for mixed-signal circuit implementations where a control signal output from a power control block includes an illegal or incompatible signal in a standardized power format framework. In this schematic diagram illustrated in FIG. 6, the exemplary implementation includes a switch 602, a power management block or power control block 604 connected to the switch 602 and having two output ports—one for the power supply signal 610 (e.g., pmc.sup) and the other for the power shutoff signal 612 (e.g., pmc.pso).

The power supply signal 610 provides power supply to the first power domain 608, and the power shutoff signal 612 controls the on/off state of the first power domain 608 through the switch 602 according to the power data specified in the CPF file. In some of these embodiments, the power control block includes a non-logic power control block such as a wreal power control block. The exemplary implementation further includes two different power domains PD_1 (608) connected to switch 602 and PD_2 (606). In these embodiments, the following CPF condition statement may be added to, for example, the CPF file for an electronic circuit design including the exemplary implementation illustrated in FIG. 6:
CFP file:
create_power_domain -name PD_1 \
-shutoff_condition {pmc.pso<1.0}\
-active_state_conditions {NC18@{pmc.sup>1.5}\
NC12@{{pmc.sup>1.0)&&(pmc.sup<1.5)}}

In the aforementioned CPF condition statement, the non-logic wreal signal from the power control block 604 may be used in the shutoff condition and the active state condition statements to model the power data or the power intent in the power data. In addition, both "pmc.sup" and "pmc.pso" are illegal and incompatible with CPF because both signals are non-logic and are thus not recognized by CPF as legal inputs. Therefore, the expressions "pmc.sup>1.5", "pmc.sup>1.0", and "pmc.sup<1.5" are also illegal and incompatible with CPF. Moreover, the shutoff condition "-shutoff_condition {pmc.pso<1.0}" defines the power domain will be shut off when pmc.pso is less than 1.0V. The active state conditions "-active_state_conditions {NC18@{pmc.sup>1.5} NC12@{(pmc.sup>1.0)&&(pmc.sup<1.5)}}" defines the two power states—NC18 and NC12—that are dependent upon the voltage values of the power supply signal pmc.sup. It is noted that although the CPF framework recognizes and thus can process the Boolean expression {( )&&( )}, the two conditions (pmc.sup>1.0) and (pmc.sup<1.5) are both wreal and are thus not recognized by CPF.

Various embodiments described herein process such conditions without using one or more wrappers for the power control block that generates the illegal or incompatible signals (pmc.sup, which is wreal) so as to disturb the original hierarchical structure of the electronic design (e.g., by adding a hierarchical level to accommodate the one or more wrappers) or having to insert a translator module to translate the illegal signal or expression (pmc.sup or pmc.pso) into a legal or compatible signal or expression so that the CPF framework (e.g., a CPF parser) will recognize such translated signals or expressions.

For example, some embodiments may use an external parser (e.g., Verilog-AMS parser), a solver, or an evaluation or elaboration database to evaluate the conditions "{pmc.sup>1.5}", "{pmc.sup>1.0}" and "{pmc.sup<1.5}" to obtain the Boolean outputs, which are legal in and compatible with the CPF framework, and then transmit the Boolean outputs back to the CPF framework for final determination of the outcome of {(pmc.sup>1.0)&&(pmc.sup<1.5)} for NC12. It is further noted that the signal values for "pmc.pso" and "pmc.sup" as well as the specified conditions "1.0" and "1.5" all represent the actual values, rather than some mapped or translated values, that are explicitly and directly specified in the CPF framework.

Figure 7:
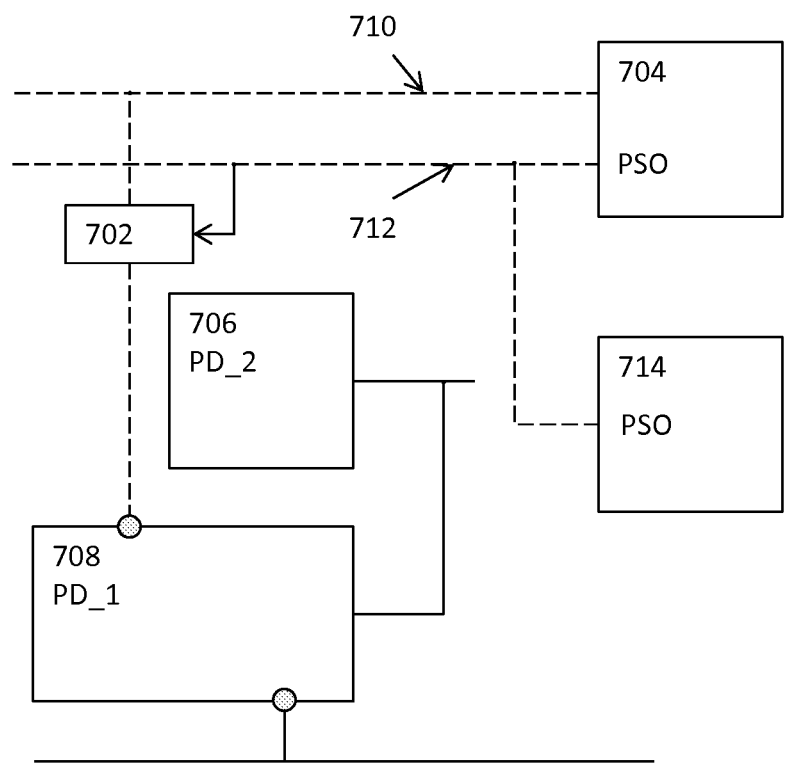
FIG. 7 illustrates a schematic diagram of an exemplary implementation of a part of an electronic circuit in accordance with some embodiments.

FIG. 7 illustrates a schematic diagram of an exemplary implementation of a part of an electronic circuit in accordance with some embodiments. More specifically, the exemplary implementation illustrates the capability of directly using both legal and compatible as well as illegal and incompatible signals in, for example, a CPF file in the CPF framework provided by some embodiments described herein for mixed-signal circuit implementations where control signals output from two power control blocks include a combination of legal and compatible signal(s) and illegal or incompatible signal(s) in a standardized power format framework. In this schematic diagram illustrated in FIG. 7, the exemplary implementation includes a switch 702, a first power management block or power control block 704 connected to the switch 702 and having two output ports—one for the power supply signal 710 (e.g., pmc.sup) and the other for the power shutoff signal 712 (e.g., pmc.pso).

The power supply signal 710 provides power supply to the first power domain 708, and the power shutoff signal 712 controls the on/off state of the first power domain 708 through the switch 702 according to the power data specified in the CPF file. In some of these embodiments, the power control block includes a non-logic power control block such as a wreal power control block. The exemplary implementation also includes a second power control block or power management block 714 having one output port for the shutoff signal 712 and connected to the shutoff port of the first power control block 704. The exemplary implementation further includes two different power domains PD_1 (708) connected to switch 702 and PD_2 (706). In these embodiments, the following CPF condition statement may be added to, for example, the CPF file for an electronic circuit design including the exemplary implementation illustrated in FIG. 7.

CFP file:
   create_power_domain -name PD_1 \
      -shutoff_condition {!pmc1.pso && (pmc2.pso<1.0)}

In the aforementioned exemplary implementation, the first power control block includes a wreal module, while the second power control block 714 includes a logic module, both of which are used to issue signals "pmc1 pso" and "pmc2.pso" to control the on/off states of the first power domain 706. The shutoff condition "{!pmc1.pso && (pmc2.pso<1.0)}" for the first power domain 706 is when "pmc1.pso" is logic zero, and when "pmc2.pso" is less than 1.0V. In the CPF framework, the first shutoff condition "!pmc1.pso" is logic and thus can be directly evaluated by the CPF framework by using, for example, the CPF parser. The CPF framework recognizes and thus can process the Boolean expression {( )&&( )}. Nonetheless, the second shutoff condition "pmc2.pso<1.0" includes the real-valued signal "pmc2.pso", and the expression "pmc2.pso<1.0" is also real-valued. Therefore, the CPF framework does not recognize the real-valued pmc2.pso and cannot process the expression.

Various embodiments described herein process such conditions without using one or more wrappers for the power control block that generates the illegal or incompatible signals (pmc2.pso, which is real-valued) so as to disturb or change the original hierarchical structure of the electronic design (e.g., by adding a hierarchical level to accommodate the one or more wrappers) or having to insert a translator module to translate the illegal signal or expression (pmc2.pso) into a legal or compatible signal or expression so that the CPF framework (e.g., a CPF parser) will recognize such translated signals or expressions.

For example, some embodiments may use an external parser (e.g., Verilog-AMS parser), a solver, or an evaluation or elaboration database to evaluate the conditions "pmc2.pso<1.0" to obtain the Boolean output, which is legal in and compatible with the CPF framework, and then transmit the Boolean output back to the CPF framework for final determination of the outcome of "-shutoff_condition {!pmc1.pso && (pmc2.pso<1.0)}". It is further noted that both the signal value for "pmc2.pso" as well as the specified conditions "1.0" represent the actual values, rather than some mapped or translated values, that are explicitly and directly specified in the CPF framework.

System Architecture Overview

Figure 8:
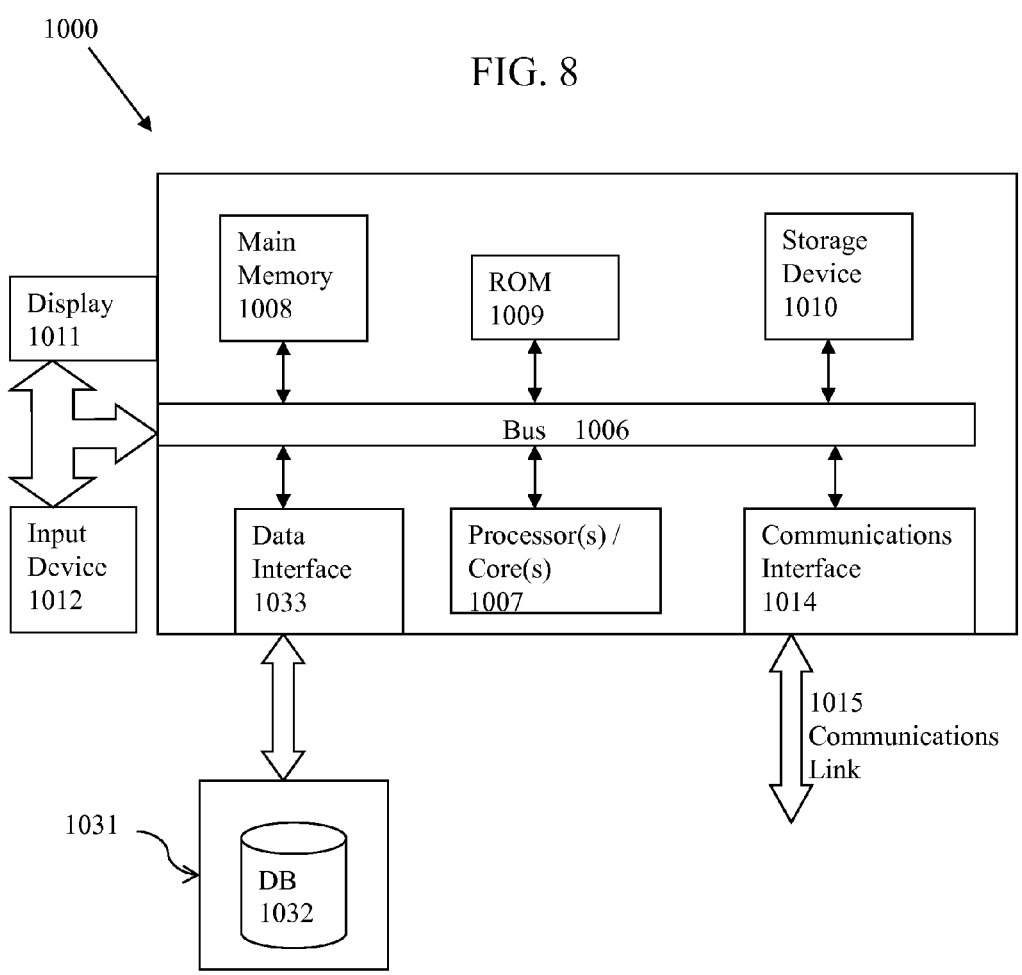
FIG. 8 illustrates a computerized system on which a method for implementing mixed-signal electronic circuit designs with power data in standardized power formats may be implemented.

FIG. 8 illustrates a block diagram of an illustrative computing system 1000 suitable for implementing analog behavioral modeling and IP (intellectual property) integration using SystemVerilog Hardware Description Language (HDL) as described in the preceding paragraphs with reference to various figures. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control (not shown).

According to one embodiment, computer system 1000 performs specific operations by one or more processor or processor cores 1007 executing one or more sequences of one or more instructions contained in system memory 1008. Such instructions may be read into system memory 1008 from another computer readable/usable storage medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1007, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1000. According to other embodiments of the invention, two or more computer systems 1000 coupled by communication link 1015 (e.g., LAN, PTSN, or wireless network) may perform the sequence of instructions required to practice the invention in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010, or other non-volatile storage for later execution. In an embodiment, the computer system 1000 operates in conjunction with a data storage system 1031, e.g., a data storage system 1031 that contains a database 1032 that is readily accessible by the computer system 1000. The computer system 1000 communicates with the data storage system 1031 through a data interface 1033. A data interface 1033, which is coupled to the bus 1006, transmits and receives electrical, electromagnetic or optical signals that include data streams representing various types of signal information, e.g., instructions, messages and data. In embodiments of the invention, the functions of the data interface 1033 may be performed by the communication interface 1014.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing a mixed-signal electronic design using standardized power data, comprising:
    at least one processor or at least one processor core executing a process, the process comprising:
    identifying a mixed-signal electronic design;
    identifying, generating, or modifying, with an aid of a standardized power format mechanism including or coupled with the at least one processor, standardized power data in a standardized power format having an illegal signal in the mixed-signal electronic design by introducing one or more changes to generate updated standardized power data from the standardized power data; and
    implementing the mixed-signal electronic design by using the updated standardized power data including the illegal signal for manufacturing of a mixed signal electronic circuit, wherein the illegal signal is not recognized by a standardized power format framework for the standardized power format and comprises at least one of a power control signal or an expression including an incompatible or illegal signal to implement power intent for the mixed-signal electronic design.

2. The computer implemented method of claim 1, wherein the standardized power format includes at least one of Common Power Format (CPF) and Unified Power Format (UPF).

3. The computer implemented method of claim 1, wherein the act of implementing the mixed-signal electronic design using updated standardized power data including the illegal signal is performed without using one or more wrappers for an electronic circuit design block that generates the illegal signal.

4. The computer implemented method of claim 3, wherein the act of implementing the mixed-signal electronic design using updated standardized power data including the illegal signal is performed without adding one or more hierarchical levels that change an original hierarchical structure of the mixed-signal electronic design.

5. The computer implemented method of claim 1, wherein the act of implementing the mixed-signal electronic design using updated standardized power data including the illegal signal is performed without using a translator module to translate the illegal signal to another form that is recognized by a standardized power format framework for the standardized power format.

6. The computer implemented method of claim 1, the process further comprising:
    processing power related content in the mixed-signal electronic design using one or more native processes or modules in a standardized power format framework for the standardized power format; and
    performing virtual port mapping for a port of a circuit design block in the mixed-signal electronic circuit to generate a virtual port for the port.

7. The computer implemented method of claim 6, the process further comprising:
    instantiating an instance of the circuit design block in the mixed-signal electronic design using the virtual port, rather than the port in the circuit design block; and
    performing one or more analyses for the mixed-signal electronic circuit using the updated power data including the illegal signal and the instance of the circuit design block, wherein the act of implementing the mixed-signal electronic design also uses the instance of the circuit design block.

8. The computer implemented method of claim 7, wherein:
    the one or more analyses comprise at least one of design modeling, design synthesis, schematic design implementation, schematic level simulation, physical design implementation, post-layout optimization, functional verification including one or more of formal verification, logic simulation, and intelligent verification, analog verification, physical verification including design rule check, layout versus schematic check, exclusive OR check, electrical rule check, and antenna checks, one or more simulations, or one or more analyses including timing analysis, static timing analysis, and power network analyses.

9. The computer implemented method of claim 1, the act of identifying, generating, or modifying the standardized power data in the standardized power format with the illegal signal in the mixed-signal electronic design comprising:
    parsing at least a part of the standardized power data in the standardized power format including the illegal signal;
    maintaining one or more pertinent elements of the at least a part of the standardized power data in one or more databases; and
    evaluating the at least a part of the standardized power data.

10. The computer implemented method of claim 9, the act of parsing at least a part of the standardized power data comprising:
    identifying an object from the at least a part of the standardized power data;
    determining whether the object includes a legal signal that is recognized in a standardized power format framework for the standardized power data;
    determining whether the object includes a legal expression that is recognized in the standardized power format framework for the standardized power data; and
    identifying a first database from the one or more databases for the object.

11. The computer implemented method of claim 10, the act of determining whether the object includes the legal signal comprising:
    determining whether the object includes a switch module;
    determining whether the object includes a legal mixed-signal; and
    determining whether the object includes a legal expression recognized by an extension to the standardized power format.

12. The computer implemented method of claim 9, the act of maintaining the one or more pertinent elements comprising:

identifying a first element from the one or more pertinent elements of the at least a part of the power data;
determining whether the first element includes a legal signal for the standardized power format;
identifying a first database from the one or more databases for the first element; and
determining whether there exists a second element in the one or more pertinent element.

13. The computer implemented method of claim 12, the act of maintaining the one or more pertinent elements comprising:
identifying the second element from the one or more pertinent elements of the at least a part of the power data;
determining whether the second element includes the illegal signal for the standardized power format; and
identifying a second database from the one or more databases for the second element.

14. The computer implemented method of claim 9, the act of evaluating the at least a part of the standardized power data comprising:
identifying or determining a change in a signal of the one or more pertinent elements;
identifying or determining an expression associated with the signal; and
determining whether the expression includes a combination of a legal element and an illegal element.

15. The computer implemented method of claim 14, wherein the act of determining whether the expression includes the combination of the legal element and the illegal element comprises:
identifying the legal element from the combination, wherein the expression is determined to include the combination of the legal element and the illegal element;
evaluating the legal element by using one or more native processes or modules that are built into a standardized power format framework for the standardized power data to determine a first evaluation result for the legal element;
excluding the legal element from the combination;
providing the first evaluation result to the standardized power format framework to use the one or more native processes or modules that are built into the standardized power format framework to evaluate the combination; and
performing power processing for the mixed-signal electronic design.

16. The computer implemented method of claim 14, wherein the act of determining whether the expression includes the combination of the legal element and the illegal element comprises:
identifying the illegal element from the combination;
evaluating the illegal element by using an evaluation to determine a second evaluation result for the illegal element, wherein the illegal element is not recognized by one or more native processes or modules that are built into a standardized power format framework for the standardized power data;
providing the second evaluation result to the standardized power format framework to use the one or more native processes or modules that are built into the standardized power format framework to evaluate the combination; and
performing power processing for the mixed-signal electronic design.

17. A system for implementing a mixed-signal electronic design using standardized power data, comprising:
at least one processor or at least one processor core that is at least to:
identify a mixed-signal electronic design;
identify, generate, or modify, with an aid of a standardized power format mechanism including or coupled with the at least one processor, standardized power data in a standardized power format with illegal signal in the mixed-signal electronic design by introducing one or more changes to generate updated standardized power data from the standardized power data;
implement the mixed-signal electronic design by using the updated standardized power data including the illegal signal for manufacturing of a mixed signal electronic circuit, wherein the illegal signal is not recognized by a standardized power format framework for the standardized power format and comprises at least one of a power control signal or an expression including an incompatible or illegal signal to implement power intent for the mixed-signal electronic design; and
one or more non-transitory computer accessible storage media that are to:
store the power data and the mixed-signal electronic design.

18. The system of claim 17, in which the at least one processor or at least one processor core is further to:
process power related content in the mixed-signal electronic design using one or more native processes or modules in a standardized power format framework for the standardized power format;
perform virtual port mapping for a port of a circuit design block in the mixed-signal electronic circuit to generate a virtual port for the port;
instantiate an instance of the circuit design block in the mixed-signal electronic design using the virtual port, rather than the port in the circuit design block; and
perform one or more analyses for the mixed-signal electronic circuit using the updated power data including the illegal signal and the instance of the circuit design block, wherein the act of implementing the mixed-signal electronic design also uses the instance of the circuit design block.

19. The system of claim 17, in which the at least one processor or at least one processor core that is to identify, generate, or modify the standardized power data in the standardized power format with the illegal signal in the mixed-signal electronic design is further to:
parse at least a part of the standardized power data in the standardized power format including the illegal signal;
maintain one or more pertinent elements of the at least a part of the standardized power data in one or more databases; and
evaluate the at least a part of the standardized power data.

20. The system of claim 19, in which the at least one processor or at least one processor core that is to parse at least the part of the standardized power data is further to:
identify an object from the at least a part of the standardized power data;
determine whether the object includes a legal signal that is recognized in a standardized power format framework for the standardized power data;
determine whether the object includes a legal expression that is recognized in the standardized power format framework for the standardized power data; and
identify a first database from the one or more databases for the object.

21. The system of claim 20, in which the at least one processor or at least one processor core that is to maintain one or more pertinent elements is further to:
- determine whether the object includes a switch module;
- determine whether the object includes a legal mixed-signal; and
- determine whether the object includes a legal expression recognized by an extension to the standardized power format.

22. The system of claim 21, in which the at least one processor or at least one processor core that is to maintain one or more pertinent elements is further to:
- identify a first element from the one or more pertinent elements of the at least a part of the power data;
- determine whether the first element includes a legal signal for the standardized power format;
- identify a first database from the one or more databases for the first element;
- determine whether there exists a second element in the one or more pertinent element;
- identify the second element from the one or more pertinent elements of the at least a part of the power data;
- determine whether the second element includes the illegal signal for the standardized power format; and
- identify a second database from the one or more databases for the second element.

23. The system of claim 19, in which the at least one processor or at least one processor core that is to evaluate the at least a part of the standardized power data is further to:
- identify or determine a change in a signal of the one or more pertinent elements;
- identify or determine an expression associated with the signal; and
- determine whether the expression includes a combination of a legal element and an illegal element.

24. An article of manufacture comprising a non-transitory computer accessible storage medium having stored thereupon a sequence of instructions which, when executed by at least one processor or at least one processor core executing one or more threads, causes the at least one processor or the at least one processor core to perform a method for implementing a mixed-signal electronic design using standardized power data, the method comprising:
- at least one processor or at least one processor core executing a process, the process comprising:
  - identifying a mixed-signal electronic design;
  - identifying, generating, or modifying, with an aid of a standardized power format mechanism including or coupled with the at least one processor, standardized power data in a standardized power format having an illegal signal in the mixed-signal electronic design by introducing one or more changes to generate updated standardized power data from the standardized power data;
  - implementing the mixed-signal electronic design by using the updated standardized power data including the illegal signal for manufacturing of a mixed signal electronic circuit, wherein the illegal signal is not recognized by a standardized power format framework for the standardized power format and comprises at least one of a power control signal or an expression including an incompatible or illegal signal to implement power intent for the mixed-signal electronic design.

25. The article of manufacture of claim 24, the process further comprising:
- processing power related content in the mixed-signal electronic design using one or more native processes or modules in a standardized power format framework for the standardized power format;
- performing virtual port mapping for a port of a circuit design block in the mixed-signal electronic circuit to generate a virtual port for the port;
- instantiating an instance of the circuit design block in the mixed-signal electronic design using the virtual port, rather than the port in the circuit design block; and
- performing one or more analyses for the mixed-signal electronic circuit using the updated power data including the illegal signal and the instance of the circuit design block, wherein the act of implementing the mixed-signal electronic design also uses the instance of the circuit design block.

26. The article of manufacture of claim 25, the act of identifying, generating, or modifying the standardized power data in the standardized power format with the illegal signal in the mixed-signal electronic design further comprising:
- parsing at least a part of the standardized power data in the standardized power format including the illegal signal;
- maintaining one or more pertinent elements of the at least a part of the standardized power data in one or more databases; and
- evaluating the at least a part of the standardized power data.

27. The article of manufacture of claim 26, the act of parsing at least the part of the standardized power data further comprising:
- identifying an object from the at least a part of the standardized power data;
- determining whether the object includes a legal signal that is recognized in a standardized power format framework for the standardized power data;
- determining whether the object includes a legal expression that is recognized in the standardized power format framework for the standardized power data; and
- identifying a first database from the one or more databases for the object.

28. The article of manufacture of claim 26, the act of maintaining the one or more pertinent elements comprising:
- identifying or determining a change in a signal of the one or more pertinent elements;
- identifying or determining an expression associated with the signal; and
- determining whether the expression includes a combination of a legal element and an illegal element.

29. The article of manufacture of claim 26, the act of evaluating the at least a part of the standardized power data further comprising:
- identifying or determining a change in a signal of the one or more pertinent elements;
- identifying or determining an expression associated with the signal; and
- determining whether the expression includes a combination of a legal element and an illegal element.

* * * * *